United States Patent Office 2,888,418
Patented May 26, 1959

2,888,418

PRODUCTION OF COATED SAND

John Albanese, Maywood, and Chester W. Fitko, Chicago, Ill.

No Drawing. Application October 22, 1953
Serial No. 387,786

4 Claims. (Cl. 260—28)

This invention relates to improvements in the production of sand precoated with resin and particularly adapted for use in the "shell molding" process.

More particularly, the present invention relates to improvements in the method of producing storage-stable, substantially free-flowing sand particles whereby each sand grain is provided with a solid, nontacky enveloping coating of potentially thermosetting phenolic resin composition and an outermost coating of solid, nontacky, unctuous material, and to the novel properties, utility and advantages of the resulting product.

The "shell molding" process for the production of sand mold sections for the casting of metals as known in the prior art has in general comprised the employment of an essentially dry mixture of sand and powdered resin and when required powdered resin curing and accelerating agents, and the depositing of such mixture against the face of a heated metal pattern coated with a lubricating or release agent such as a silicone resin. This is generally accomplished by placing the aforesaid dry mixture in the bottom of a pivotally supported or other container with the top closed by the metallic pattern. After the pattern is preheated to about 400–500° F., the container is inverted so that the sand-resin mixture is thrown against it, and in less than a minute the resin melts and fuses and forms a unitary crust of from about 1/8 to about 1/2 inch in thickness. Excess sand-resin mixture, which has not been reached by heat in an amount to fuse the resin, is removed for subsequent use, and the preliminary shell or crust on the pattern is subjected to further heat, as in an oven, to cure the resin to the thermoset or infusible condition. It is then separated from the pattern in the form of a rigid shell mold section ready for use for the casting of metals.

As distinguished from the employment of dry sand-resin mixtures in the aforesaid process, the copending applications of Fitko and Horn, Serial Nos. 297,396, filed July 5, 1952, now Patent No. 2,706,188, and 346,534, filed April 2, 1953, teach the production of storage-stable, free-flowing sand grains, each provided with a solid, non-tacky coating of potentially thermosetting phenolic resin for use in the aforesaid shell molding process in lieu of the dry sand-resin mixture. This eliminates dust and explosion hazards of a powdered mix, avoids separation and stratification of the components, permits employment of conventional foundry sand handling equipment, permits the production of shell molds of more uniform character and of improved physical properties, and saving in the amount of resin required.

The processes of the aforementioned Fitko and Horn copending applications for coating sand with resin comprise in general the placing of foundry sand into an intensive mixing vessel, together with from about 2 to 4% by weight of the sand of acid-catalyzed, fusible phenol-formaldehyde resin, i.e., novolak. These are mixed together to uniformly distribute the resin over the individual sand grains, with the aid of heat adequate to maintain the resin, whether it be initially normally solid or normally liquid, in liquid condition. While the resin is still in liquid condition and while continuing mixing, there is added about 8 to 20% of hexamethylenetetramine by weight of the resin and the two permitted to partially react and then cooled, or permitted to cool, below the melting point of the modified resin, and to arrest further reaction, while continuing mixing and cooling to reduce the mix to discrete particle form.

As distinguished from the processes described in the aforementioned copending applications, in accordance with the present invention we have now found that substantially free-flowing and storage-stable discrete particles of sand individually coated with a layer of potentially thermosetting resin composition, may be formed by a "cold process," i.e., without the aid of heat such as the employment of preheated sand or introduction of heat otherwise to the mixing vessel, by combining with or building into the resin-coated sand an unctuous material, the entire process being conducted at normal or prevailing conditions of atmospheric temperature, and thus at great economy. In the process of the present invention the unctuous material not only provides a lubricant in the mixing process to facilitate the mixing and coating with reduction in power requirement and wear of equipment and a parting compound to facilitate removal of the formed mold or shell from the metallic pattern in the aforementioned process for production of shell molds, but additionally provides a marked improvement in the tensile strength of products formed from the coated sand, such as shell molds or cores, and further substantially eliminates tackiness of the resin coated sand which might result when using normally liquid resins in the absence of the unctuous material.

In accordance with the present invention we prefer to use a normally liquid novolak, i.e., an acid-catalyzed reaction product of from about .5 to about .73 mol of formaldehyde per mol of phenol formed as a clear, oily liquid resin layer at the end of the reaction and dehydrated to a solids content of from about 70% to about 80% by weight, and if desired the solids content may be further increased by removing volatiles. However, we find the liquid resin suitable at the indicated solids content, although it may be advantageous to add about 10% of ethanol by weight of the resin to reduce tack, particularly when it is employed at a reduced volatile, i.e., increased solids content.

This is distinguished from the employment of solid novolaks, i.e., those formed with from about .75 to about .90 mol of formaldehyde per mol of phenol and are solid at room temperature. Such solid resins, although useful in the present process, are not fully equivalent in that they require that the resin be dissolved in at least equal parts of alcohol which is uneconomical, particularly since the present process operated without the aid of heat renders recovery unfeasible. Although the employment of such normally solid resins in solution results in end products of lower tensile strength than when employing the normally liquid resins, the tensile strength is considerably enhanced by the unctuous material in each case, and in each instance the unctuous material tends to eliminate tack and makes processing of the mixes easier.

In accordance with the practice of the preferred embodiment of the present invention, sand to be coated is placed at room temperature into a suitable intensive mixing device, such as a Simpson muller, Werner-Pfleider mixer, Beardsley-Piper mixer, or the like, and the normally liquid novolak resin is added thereto while mixing. The amount of resin added is to some extent related to the character of the sand to be coated. Thus with a washed and dried AFS silica sand such as Wedron 60M, from about 0.5% to about 2.5% of resin solids per weight of sand is adequate as compared with the requirement of at least 6% or more when previously employing dry powdered resin-sand mixes. With other sands which include some absorptive clay content somewhat larger amounts, for example up to 4–5% of the resin, may be required. Hexamethylenetetramine for eventual conversion of the novolak resin to the thermoset or infusible condition is added to the mix, preferably in powdered form, in the proportion of from about 8 to about 20% by weight of the resin solids at any desired point, either initially with the sand, with the resin, or on subsequent addition of the unctuous additive. Due to the absence of heat in the process, there does not appear to be any rapid reaction between the resin and the hexamethylenetetramine as evidenced by lack of development of a yellow color which results when the two are heated together, accompanied by rapid increase of melt point of the resin on the sand. However, some degree of progressive reaction, even in the absence of heating occurs, since some change in at least the physical properties of the resin does result in the present process. Thus if the sand and liquid resin alone are intensively mixed in an 18-inch open Simpson laboratory muller, it requires 10 to 15 minutes for the resin-coated sand to reach a tacky semi-free flowing condition; whereas if the hexamethylenetetramine is added initially, this same condition is reached in about 5 to 7 minutes. Some increase in melting point of the resin on the sand also takes place.

The unctuous material is preferably added at least in part to the mix after the resin and hexamethylenetetramine are intimately distributed with and coated over the sand and when the mix has reached the above indicated semi-free flowing condition and mixing continued for several minutes, at the end of which time the mass is reduced to a free-flowing discrete particle condition composed of particles of sand each individually coated with a potentially thermosetting resin composition enveloped by a film of solid, nontacky, unctuous material.

In accordance with presently preferred practice, a portion of the unctuous material is promptly added to the sand with the resin to facilitate mixing, and the balance then added with further mixing to break up clumps and coat the grains with a film of the unctuous material to provide free-flowing, nontacky, discrete, individually coated sand grains. In the alternative, all of the wax may be added at one time either at the beginning of the mixing operation or at the indicated intermediate mixing stage.

The unctuous material is added in the amount of from about 2% to about 15% by weight of the resin, depending on the sand, type of resin, percent of resin employed, and the nature of the unctuous material, the larger proportions, particularly when employing relatively softer materials, providing some "clumping" tendency desirable in handling the coated sand for blowing techniques. The harder unctuous materials may be added in powdered form, and the softer ones added either as pastes or solutions for the purpose of obtaining good mixing and coating.

Suitable unctuous materials are waxes or wax-like materials which are normally solids, such as microcrystalline and other paraffin waxes, synthetic waxes such as substituted polyamide of stearic acid described in U.S. Patent 2,429,664 known as Acrawax C; waxy medium molecular weight polyethylenes such as Alcowax 7; methylene bis-stearamide known as Armowax; and materials such as calcium, lithium, and zinc stearates.

As previously indicated, the employment of these waxy or unctuous additives results in an increase of tensile strength of products formed in accordance with the present invention, as compared to products formed by omitting them, and this holds true regardless of the melting point of the waxy solid employed, paraffin waxes such as Warco 70 of approximately 120° F. melting point and Warco 150 of about 150° F. melting point being equally suitable for increasing tensile strength 100 or more pounds per square inch as waxy materials of higher melting point such as the described Acrawax C which has a melting point of about 284–289° F. Tensile strengths herein referred to are those determined on standard tensile briquets prepared according to the American Foundryman's Society specification.

As an example of the process of the present invention, for the purpose of illustration and not limitation, 200 pounds of washed and dried Wedron 60 mesh, Ottowa silica sand (85AFS) was placed into a Beardsly-Piper "Speedmuller" together with 4 pounds of liquid novolak resin formed from .7 mol of formaldehyde per mol of phenol and dehydrated to a 70% solids content, and .48 pounds of powdered hexamethylenetetramine containing 5% talc. These were mixed at room temperature for three minutes with cold air blown through the mixing vessel to facilitate removal of volatiles. At this time the mass started to break up and .28 pound of Acrawax C was added and mixing continued for two more minutes and the product discharged as a free-flowing sand with some small lumps which were removed by screening. The melting point of the coating of the resin was 175° F., and test briquets formed by blowing at a pressure of 25 pounds per square inch exhibited a tensile strength after cure of 360 pounds per square inch.

As another example, 400 pounds of the same sand was placed in a No. 1½ open Simpson muller together with .78 pound of powdered hexamethylenetetramine, 1.8 pounds of Acrawax C, and 6 pounds of liquid novolak resin formed by reacting .725 mol of formaldehyde per mol of phenol and dehydrated to a solids content of about 72%. These were mulled for seven minutes, at which time the mass started to break up and become powdery, and then .30 additional pound of Acrawax C added. After further mulling for sixteen minutes the mass was discharged in the form of discrete free-flowing coated sand particles. The time cycle of this process can be reduced by providing blowing means to aid in removing volatiles. The melting point of the coating on the sand was 175° F., and the standard briquet test showed a tensile strength of 325 pounds per square inch.

Although we have hereinbefore described and explained our invention with particular reference to the employment of two-stage resins, i.e. of normally liquid novolak resins together with a requisite proportion of hexamethylenetetramine for placing the resin in a potentially thermosetting combination or condition, advantageous employment of one-stage liquid alkali catalyzed phenol-formaldehyde resins may also be made for minor or full replacement of the liquid two-stage resins. These one-stage liquid resins are of thermosetting character and, having been prepared from at least equi-molar proportions of a phenol and an aldehyde, or even an excess of the latter, permit employment of a single component without addition of an aldehyde to the mix and are more economical to manufacture.

The product resulting from the process of the present invention is particularly suitable for the production of shell molds and cores by means of conventional blowing machines, and if additional green strength is required to retain the coated sand in the magazine or blowhead of conventional blowing machines, this may be simply accomplished by adding a small amount, for example about 0.25% of kerosene by weight of the sand.

We claim as our invention:

1. The method of forming a substantially free-flowing mass of nontacky sand grains whereof each particle is coated with an adherent layer of potentially thermosetting resin, which comprises intimately mixing in a mixing vessel sand to be coated together with from about 2% to about 15% of normally solid waxy material by weight of the resin and liquid phenol-aldehyde resin convertible to thermoset condition, at substantially normal atmospheric conditions of temperature, until the sand grains are individually coated with the resin and the waxy material and blowing air through the mixing vessel while mixing to facilitate removal of volatiles until the mass is reduced to a substantially free-flowing, nontacky, discrete particle form.

2. The method of forming a substantially free-flowing mass of nontacky sand grains whereof each particle is coated with an adherent layer of potentially thermosetting resin, which comprises intimately mixing in a mixing vessel sand to be coated together with from about 2% to about 15% of normally solid waxy material by weight of the resin and liquid phenol-aldehyde resin convertible to thermoset condition comprised of normally liquid novolak resin and hexamethylenetetramine in amount adequate to ultimately convert the resin to the infusible condition, at substantially normal atmospheric conditions of temperature, until the sand grains are individually coated with the resin and the waxy material and blowing air through the mixing vessel while mixing to facilitate removal of volatiles until the mass is reduced to a substantially free-flowing, nontacky, discrete particle form.

3. The method of forming a substantially free-flowing mass of nontacky sand grains whereof each particle is coated with an adherent layer of potentially thermosetting resin and adapted for the production of shell molds, which comprises intimately mixing in a mixing vessel sand to be coated together with from about 2% to about 15% of normally solid waxy material by weight of the resin, liquid phenol-aldehyde resin having a solids content of from about 70% to about 80% by weight comprised of normally liquid novolak resin in an amount to provide from about 0.5% to about 5% of resin solids by weight of the sand, and hexamethylenetetramine adequate to ultimately convert the resin to the infusible state, at substantially normal atmospheric conditions of temperature, until the sand grains are individually coated with the resin and the waxy material and blowing air through the mixing vessel while mixing to facilitate removal of volatiles until the volatile content of said mix has substantially vaporized and the mass is reduced to a substantially free-flowing, nontacky, discrete particle form.

4. The process of claim 3, wherein at least a portion of the waxy material is added intermediate the mixing after the resin has been distributed over the sand and the mix is in a tacky semi-free-flowing condition.

References Cited in the file of this patent

UNITED STATES PATENTS

| | | |
|---|---|---|
| 1,508,124 | Richardson | Sept. 9, 1924 |
| 1,631,113 | Anderson | June 7, 1927 |
| 1,830,489 | Sproat | Nov. 3, 1931 |
| 2,092,903 | Brenner | Sept. 14, 1937 |
| 2,521,614 | Valyi | Sept. 8, 1950 |
| 2,706,163 | Fitko | Apr. 12, 1955 |